(12) United States Patent
Hendzel et al.

(10) Patent No.: US 7,014,030 B2
(45) Date of Patent: Mar. 21, 2006

(54) MODULAR SUBSTRUCTURE FOR MATERIAL HANDLING

(76) Inventors: Louis J. Hendzel, 127 Van Burger Rd., Owego, NY (US) 13827; Donald G. Hill, 313 W. Creek Rd., Owego, NY (US) 13827; Eric J. Reisenauer, 12 Larchmount Rd., Owego, NY (US) 13827

( * ) Notice: Subject to any disclaimer, the term of this patent is extended or adjusted under 35 U.S.C. 154(b) by 57 days.

(21) Appl. No.: 10/349,275

(22) Filed: Jan. 22, 2003

(65) Prior Publication Data
US 2004/0140412 A1    Jul. 22, 2004

(51) Int. Cl.
*B65G 47/46* (2006.01)

(52) U.S. Cl. .................... 198/368; 248/188.6; 193/2 R; 53/537

(58) Field of Classification Search .............. 248/440, 248/188.6, 188.1, 637, 672, 676, 152, 165; 211/12; 198/370.04, 368, 370.07; 269/304; 193/2 R; 53/537
See application file for complete search history.

(56) References Cited

U.S. PATENT DOCUMENTS

| | | | | |
|---|---|---|---|---|
| 691,120 A * | 1/1902 | Elliot | ........................... 248/97 |
| 862,243 A * | 8/1907 | Field | ........................... 211/12 |
| 1,018,637 A * | 2/1912 | Shults | ......................... 211/12 |
| 1,117,880 A * | 11/1914 | McMillin | ..................... 211/12 |
| 2,714,540 A * | 8/1955 | Diehm | ........................ 248/165 |
| 3,147,845 A * | 9/1964 | Harrison et al. | ....... 198/370.04 |
| 3,465,495 A * | 9/1969 | Riddington et al. | ........... 53/537 |
| 3,552,254 A * | 1/1971 | Marczy | ........................ 269/304 |
| 3,905,467 A * | 9/1975 | Babik et al. | ................. 193/2 R |
| 3,955,678 A * | 5/1976 | Moyer | .................... 198/370.07 |
| 4,026,425 A * | 5/1977 | Gruodis | ........................ 414/299 |
| 4,192,480 A * | 3/1980 | Schmidt | ...................... 248/436 |
| 4,216,933 A * | 8/1980 | Cramer, Jr. | ............... 248/188.5 |
| 4,329,831 A * | 5/1982 | Warkentin et al. | ............. 53/537 |
| 4,509,635 A | 4/1985 | Emsley et al. | |
| 4,579,229 A * | 4/1986 | Porcaro et al. | ............. 211/85.6 |
| 4,688,678 A | 8/1987 | Zue et al. | |
| 4,720,232 A * | 1/1988 | Williams | ..................... 414/607 |
| 5,050,743 A * | 9/1991 | Lazzarotti | .................... 211/12 |
| 5,226,621 A * | 7/1993 | Skoff | ........................... 248/97 |
| 5,308,037 A * | 5/1994 | Gonzalez | ..................... 248/670 |
| 5,340,099 A | 8/1994 | Romanenko et al. | |
| 5,472,097 A | 12/1995 | Villachica | |
| 5,529,171 A * | 6/1996 | Langenbeck | .............. 198/860.1 |
| 5,848,682 A | 12/1998 | Schuster et al. | |
| 6,015,039 A * | 1/2000 | Bonnet | ........................ 198/368 |
| 6,231,036 B1 * | 5/2001 | Johnson et al. | ........... 198/345.1 |
| 6,457,787 B1 * | 10/2002 | Chicoyne | ................. 312/265.4 |
| 6,533,099 B1 * | 3/2003 | Bonham et al. | ....... 198/370.07 |
| 6,648,626 B1 * | 11/2003 | Eltvedt | .................... 425/436 R |
| 6,719,119 B1 * | 4/2004 | Hendzel et al. | .......... 193/35 TE |

* cited by examiner

*Primary Examiner*—Anita M. King
(74) *Attorney, Agent, or Firm*—Michael Best & Friedrich, LLP

(57) ABSTRACT

A structural frame assembly that is adapted to support a chute of a sorting machine, the frame assembly including two laterally spaced beams and at least one cross-beam interconnecting the two laterally spaced beams, the beams and the at least one cross-beam including a projecting edge thereon.

16 Claims, 4 Drawing Sheets

MODULAR SUBSTRUCTURE FOR MATERIAL HANDLING

FIELD OF THE INVENTION

This invention relates generally to structural frame assemblies, and more particularly to structural frame assemblies having modular substructures.

BACKGROUND OF THE INVENTION

Frames are well known in the art to support various kinds of substructures. Typically, the substructure supported by the frame is fixedly mounted to the frame. The substructure may be fixedly mounted to the frame directly or in combination with brackets. Also, common fasteners or welds are often used to secure the substructure to the frame directly or to the frame through the bracket. Typically, to provide some degree of flexibility, common fasteners are used in combination with machining or forming holes in the frame to mount the substructure to the frame.

However, if it is desired to add substructure to the existing frame, additional holes in the frame are often required to mount fasteners therethrough to secure the additional substructure. Also, if it is desired to remove and relocate any of the substructure, the existing holes in the frame may be patched or left alone, and new holes have to be machined or formed to re-mount the substructure to the frame in a new location. Not only does this practice require large amounts of time and effort, but it also structurally weakens the frame as a result of removing material from the frame.

SUMMARY OF THE INVENTION

The present invention solves some of the problems associated with the prior art by providing a method and system for building frames having a modular substructure.

The frame includes two parallel, spaced lengths of C-channel beams that are coupled substantially perpendicularly by similar shaped, parallel, spaced lengths of C-channel cross-beams. The C-channel beams include lip portions partially defining an opening to the interior of the C-channel beams. The frame is supported by legs, whereby each leg is independently adjustable in height to level the frame relative to the floor or other support surface.

The frame may be made using any reasonable lengths of C-channel beams and cross-beams, and any reasonable number of cross-beams, depending on manufacturing capabilities and the end user's needs. For example, a smaller frame may include a single cross-beam providing lateral support to two C-channel beams, and a larger frame may include multiple cross-beams connecting the C-channel beams. Also, the C-channel beams and cross-beams may be any reasonable size, such that their lip portions may be varied in size during manufacturing depending on the application of the frame.

A plurality of chutes are supported by the frame, whereby the chutes deliver sorted parcels or other items from a sorting machine to a sack or other container. The chutes are supported on the frame by multiple vertical supports and horizontal supports. The vertical supports are coupled to the C-channel beams such that backing plates on the vertical supports selectively clamp the vertical supports to the lip portions of the C-channel beams. As a result of this configuration, holes are not required to be machined or otherwise formed into the frame to fastenably mount the vertical support, nor is welding required to more permanently mount the vertical support. Alternatively, components other than the chutes may be mounted upon the frame using the same clamping structure and configuration.

The chutes are supported by the vertical and horizontal supports in an inclined position, such that the vertical supports support the chutes at an upper chute portion, and the horizontal supports support the chutes at a lower chute portion. The vertical and horizontal supports are configured to support adjacent chutes thereon. Such configuration allows additional chutes to be coupled to the frame in modules, or units.

BRIEF DESCRIPTION OF THE DRAWINGS

In the drawings, wherein like reference numerals indicate like parts.

Figure 1A:
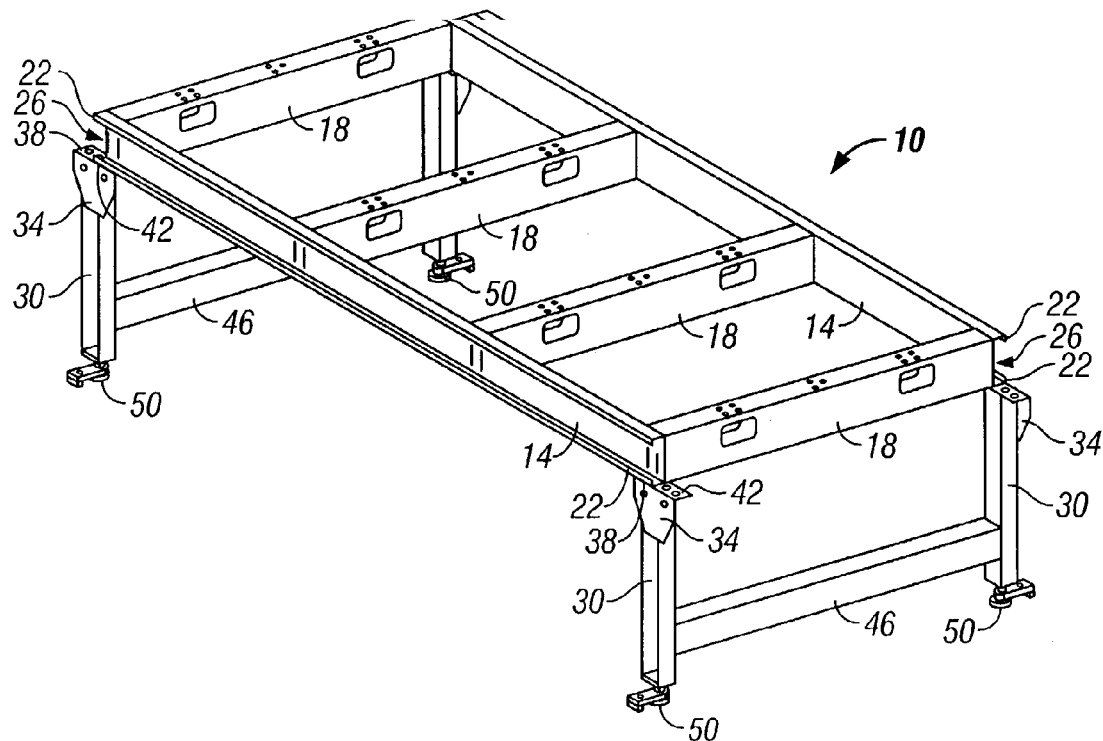
FIG. 1A is a perspective view of a structural machine frame of the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION OF THE PREFERRED EMBODIMENT

As shown in FIGS. 1A–3, a frame 10 provides the main structural support of a parcel sorting machine (not shown), wherein the invention will be further described in the context thereof. However, it should be understood that the invention is not limited to this application. The invention may also be used across different industries and applications. Examples include, among others, assembly line applications, manufacturing applications, inspection applications, printing applications, and so forth. Similarly, the invention may also be used in sorting applications besides parcel sorting. Examples include, among others, fasteners, parts, periodicals, food items, clothing, and so forth.

As shown in FIG. 1A, the frame 10 includes two parallel, C-channel beams 14 extending the length of the frame 10, and multiple parallel, C-channel cross beams 18 providing lateral support to the frame 10. The frame 10 may be made using any reasonable lengths of C-channel beams 14 and cross-beams 18, and any reasonable number of cross-beams 18, depending on manufacturing capabilities and the end user's needs. For example, a smaller frame 10 may include a single cross-beam 18 providing lateral support to two C-channel beams 14, and a larger frame may include multiple cross-beams 18 connecting the C-channel beams 14.

Figure 1B:
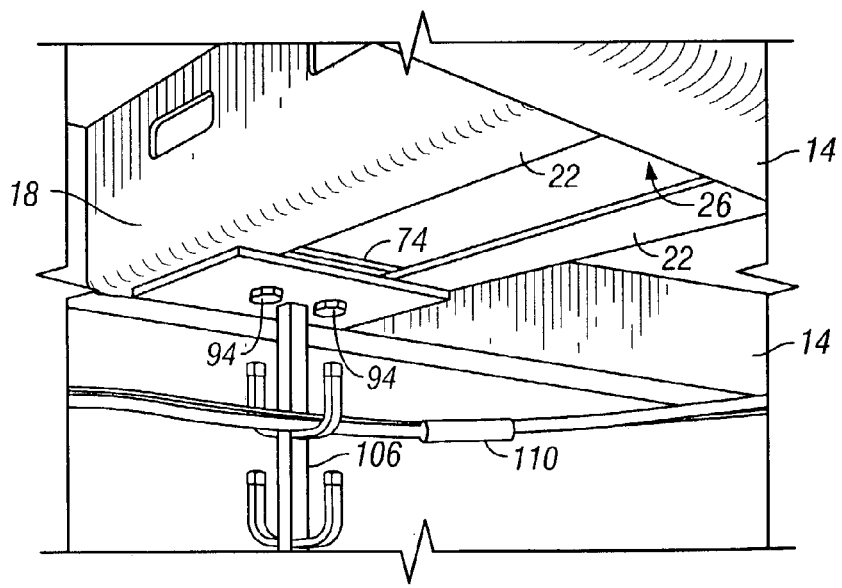
FIG. 1B is a perspective view of the underside of the structural machine frame of FIG. 1B, illustrating an electrical cable hanger clamped to the frame.

The C-channel beams 14 and cross-beams 18 generally define a "C" shaped cross-section, whereby opposing lip portions 22 define an opening 26 to the interior of the beams 14, 18. The C-channel beams 14 and cross-beams 18 may be any reasonable size, such that the lip portions 22 may be varied in size during manufacturing depending on the application of the frame 10. The C-channel beams 14 are oriented on the frame 10 such that the lip portions 22 face outside of the perimeter defined by the frame 10. The C-channel cross beams 18, however, can be oriented on the frame 10 in any manner. However, as shown in FIG. 1B, the openings 26 of the cross beams 18 are facing downward. The terms "outside", "top", "bottom", "under", "over", and the like, as used herein and in the appended claims, are for purposes of description only and are not intended to imply any particular orientation.

The C-channel beams 14 and cross beams 18 are formed from seven gauge sheet steel for increased rigidity, but alternatively, may be formed from any metal or metal alloy provided a desired frame rigidity is satisfied. The C-channel beams 14 and cross beams 18 are welded together for increased joint strength. Alternatively, the beams 14 and cross beams 18 may be fastened together using ordinary, heavy duty fasteners or rivets.

As shown in FIG. 1A, the frame 10 is vertically supported by legs 30 opposedly positioned along the C-channel beams 14. The legs 30 are fastened to the C-channel beams 14 through a frame mounting plate 34, the plate 34 having a first mounting portion 38 and a second mounting portion 42, whereby the first and second mounting portions 38, 42 support adjacent sections of frame 10. Additionally, a crosstie 46 couples each laterally opposed pair of legs 30 for additional support and rigidity of the legs 30. Like the beams 14 and cross-beams 18, the cross-tie 46 is welded to each laterally opposed pair of legs 30 for increased rigidity and joint strength. Adjustable feet 50 threadably attached to the bottom of the legs 30 further provide the legs 30 with independent height adjustment to level the frame 10 relative to the machine floor or other support surface (not shown).

Figure 2:
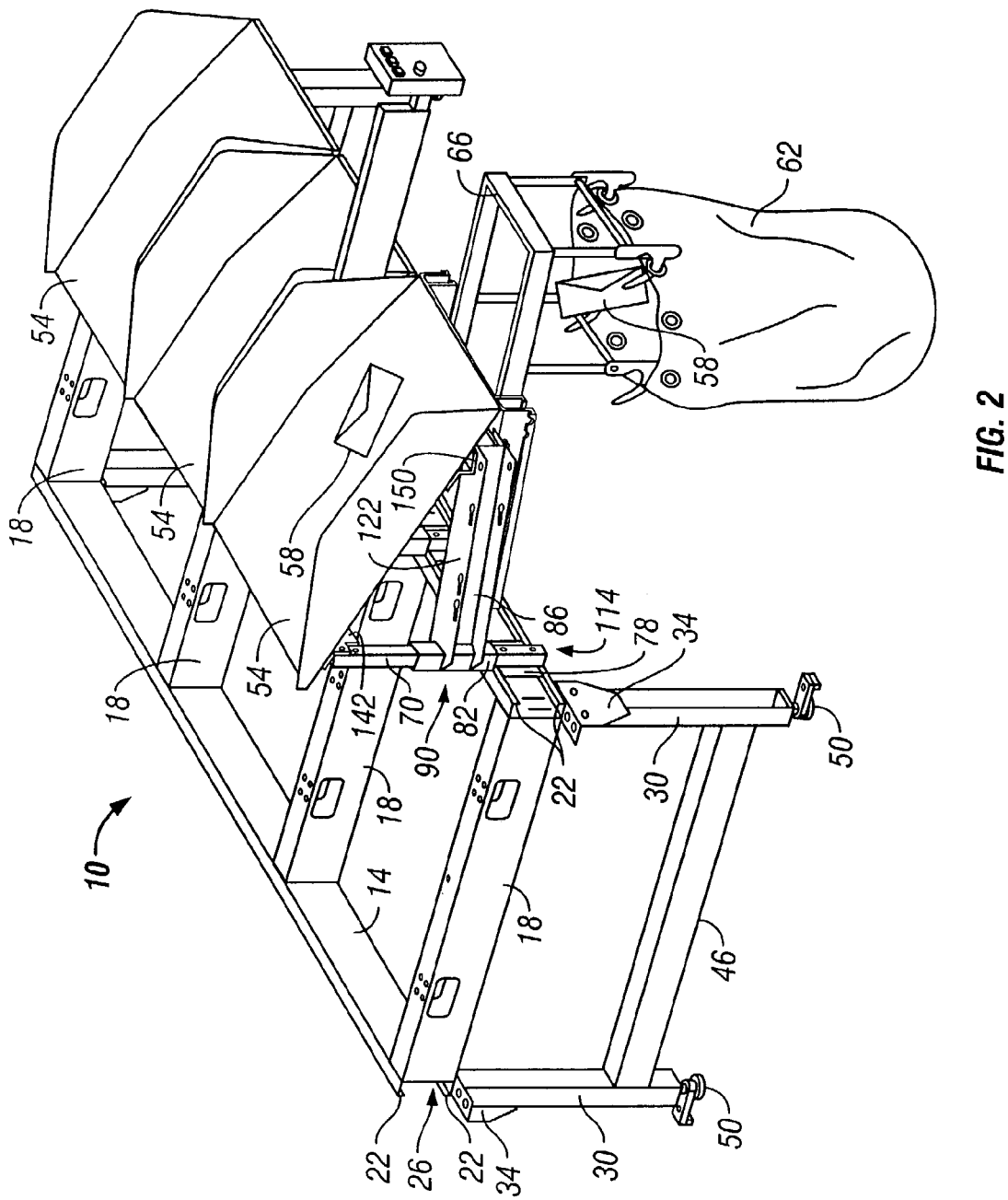
FIG. 2 is a perspective view of the structural machine frame of FIG. 1A, illustrating multiple chutes clamped to the frame.
Figure 3:
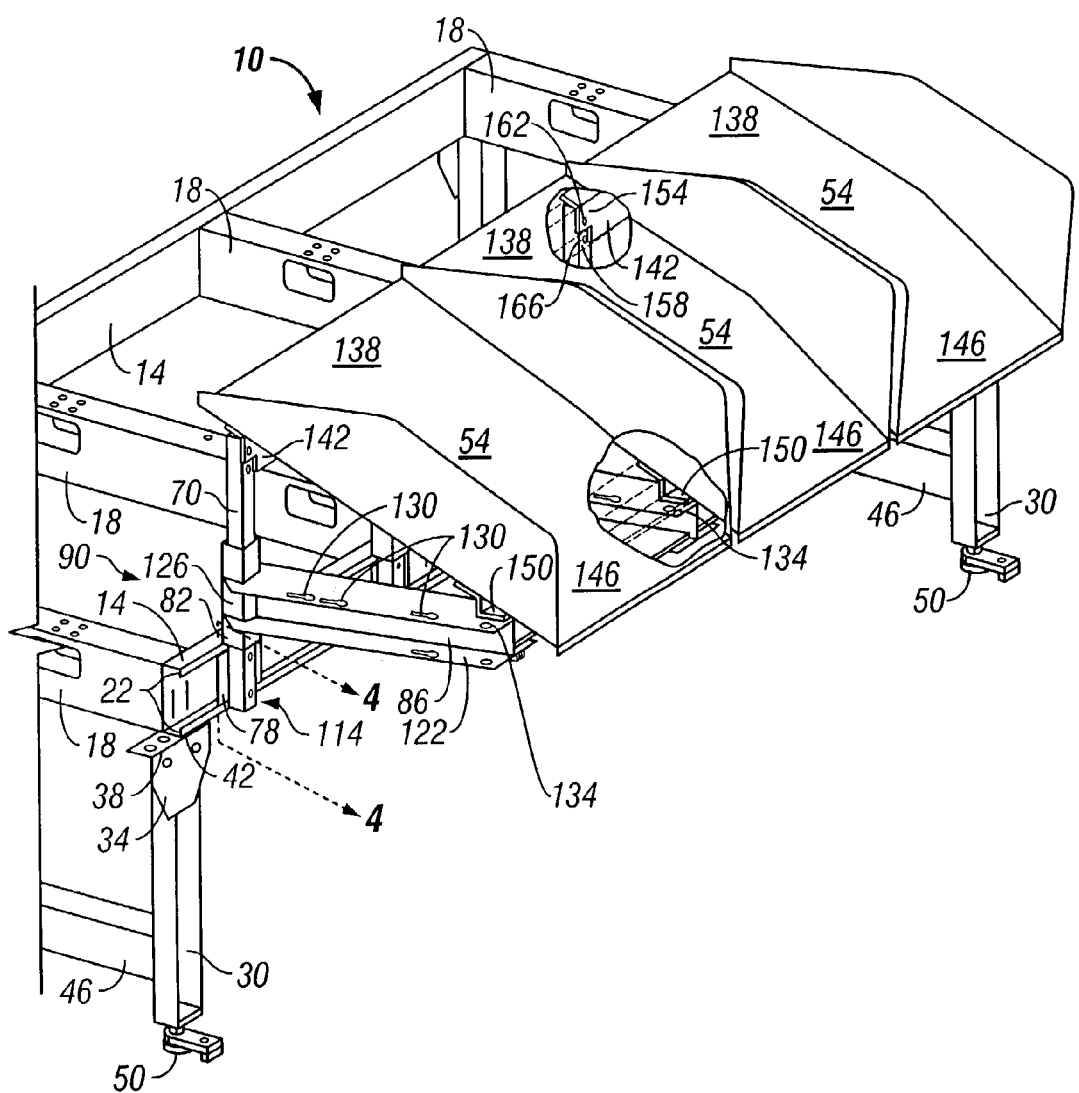
FIG. 3 is a perspective view of three adjacent chutes with partial cutaway views illustrating various mounting configurations.

As shown in FIG. 2, multiple chutes 54 are coupled to the C-channel beams 14, whereby the chutes 54 receive parcels 58 from the parcel sorting machine, and guide the parcels 58 toward a container in the form of a sack 62, which is supported below the chute 54 by a sack hanger 66. It is generally understood to those skilled in the art that the sack 62 can also be defined to include rigid-wall containers in addition to soft wall containers. Generally, as shown in FIGS. 2–3, the chutes 54 are supported by adjacent vertical supports 70. Each vertical support 70 includes multiple components coupled thereto, including a backing plate 74, a guide plate 78, a support spacer 82, and a horizontal support 86. The vertical supports 70, including the previously stated components coupled thereto, are hereinafter known as vertical support assemblies 90, which support the adjacent chutes 54.

Figure 4:
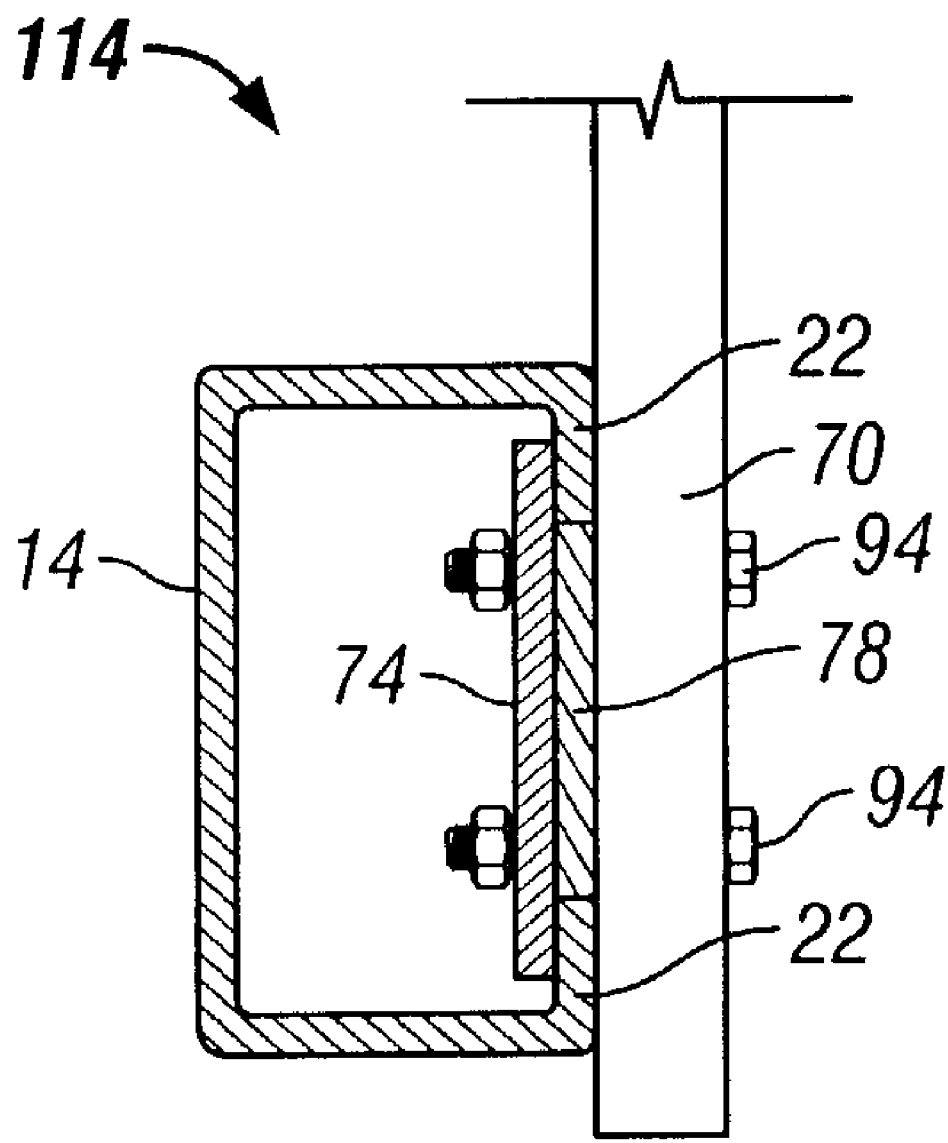
FIG. 4 is a section view of a clamping arrangement between the frame and the chute.

As shown in FIG. 4, the vertical support assemblies 90 mount to the C-channel beams 14 through a clamping arrangement, wherein the lip portions 22 are disposed between the backing plate 74 and the vertical support 70. Ordinary fasteners 94 pass through the vertical support 70, backing plate 74, and guide plate 78. The fasteners 94 are then torqued such that the backing plate 74 and vertical support 70 pinch the lip portions 22. As shown in FIG. 4, the guide plate 78 is disposed between the opposing lip portions 22 to ensure that the vertical support 70 is substantially perpendicular to the C-channel beam 14. This clamping arrangement allows additional vertical supports 70, and subsequently, additional chutes 54, to be mounted to the C-channel beams 14 without drilling holes through the frame 10 to pass fasteners therethrough. This clamping arrangement also allows for endless adjustability of the chutes 54 along the C-channel beams 14 since the chutes 54 are positionable at any location along the beams 14.

A similar clamping arrangement is also utilized to mount additional components to the C-channel beams 14 and cross beams 18. Such additional components include, among others, electrical boxes, control boxes, and electrical cable hangers 106. Preferably, the electrical boxes are mounted to the cross beams 18, such that the electrical boxes and associated electrical cables 110 are maintained within the perimeter defined by the frame 10, thus decreasing the risk of accidental exposure to the machine operator. As shown in FIG. 1B, the electrical cables 110 are routed beneath the frame 10 via the cable hangers 106, which mount to the cross beams 18 using a similar clamping arrangement as the vertical supports 70.

The clamping arrangement comprising the backing plate 74, guide plate 78, vertical support 70, and fasteners 94 is generally considered as a clamp 114 that mounts the chutes 54 to the frame 10. However, the clamp 114 may be comprised of different components, that interact in a different manner than the clamp 114 described herein, to mount the chute 54 to the frame 10. Alternatively, the clamp 114 may include a separate device attached to the vertical support 70, and may embody a conventional clamp design (not shown), such as, for example, two opposing plates interconnected via an actuating screw. As a further alternative, the frame 10 may comprise beams having different cross sections than the C-channel beams 14, 18, such that the beams include a projecting edge on which to clamp the chute 54. In turn, the clamp embodying the conventional clamp design may be oriented in any direction to engage the projecting edge of the beams to mount the chute 54 thereto.

Referring to FIGS. 2–3, the chute 54 is supported by adjacent vertical support assemblies 90 on the frame 10. The chute 54 is made from a sheet metal, such as sheet steel, and is formed into shape via a bending or stamping procedure. Alternatively, the chute 54 may be made of any sheet metal, such as aluminum, stainless steel, and so forth. As another alternative, the chute 54 may be formed from a plastic or composite material rather than from sheet metal.

As shown in FIGS. 2–3, the support spacers 82 are mounted upon and are slidable on the vertical supports 70, wherein the support spacers 82 provide spacing between the frame 10 and the horizontal supports 86, which are also ridable on the vertical supports 70. The horizontal supports 86 include beams having an "I" shaped cross section, hereinafter referred to as "I-beams 122." The horizontal supports 86 further include sleeves 126 welded to one end of the I-beams 122, wherein the sleeves 126 are slidable on the vertical supports 70. Further, the sleeves 126 are welded to the I-beams 122 such that when inserted on the vertical supports 70, the I-beams 122 extend from the frame 10 in an oblique orientation. The angular orientation of the horizontal supports 86 determines the angular orientation of the chutes 54 relative to the frame 10. Further, the horizontal supports 86 include multiple slotted holes 130 and mounting holes 134 machined therein. The slotted holes 130 and mounting holes 134 are machined into both top and bottom surfaces of the I-beams 122, so that any one horizontal support 86 can be used on either of the C-channel beams 14 of the frame 10 and provide the desired chute angle relative to the frame 10.

As shown in FIGS. 2–3, the chute 54 is mounted to adjacent vertical supports 70 along an upper chute portion 138 via an upper chute support 142, and to adjacent horizontal supports 86 along a lower chute portion 146 via a lower chute support 150. The upper and lower chute supports 142, 150 are made of sheet metal, such as sheet steel, and are formed into shape via a bending or stamping procedure. Alternatively, the chute supports 142, 150 may be made of any sheet metal, such as aluminum, stainless steel, and so forth. As another alternative, the chute supports 142, 150 may be formed from a plastic or composite material rather than from sheet metal.

The upper chute support 142 is formed having staggered mounting tabs, including an upper mounting tab 154 and a lower mounting tab 158, wherein the tabs 154, 158 are disposed on opposite ends of the upper chute support 142. The upper and lower mounting tabs 154, 158 mount, respectively, to adjacent vertical supports 70 via an upper and lower aperture 162, 166 disposed near the top of each vertical support 70. The mounting tabs 154, 158 mount to the vertical supports 70 via the apertures 162, 166, respectively, using ordinary fasteners. Alternatively, the upper chute support 142 may be riveted or welded to the vertical supports 70. The staggered mounting tabs 154, 158 allow an additional chute 54 to be added adjacent the existing chute 54. Further, the chute 54 is fastened to the upper chute support 142 using ordinary fasteners. Alternatively, the chute 54 may be riveted or welded to the upper chute support 142.

As shown in FIGS. 2–3, the lower chute support 150 is fastened to adjacent horizontal supports 86 via the mounting holes 134 in the horizontal supports 86. The mounting holes 134 are machined into the horizontal supports 86 to accept additional adjacent chutes 54, similar to the existing chute 54. Further, the chute 54 is fastened to the lower chute support 150 using ordinary fasteners. Alternatively, the chute 54 may be riveted or welded to the lower chute support 150.

The shape of the C-channel beams 14 and the clamping arrangement between the lip portions 22 of the C-channel beams 14 and the vertical supports 70 allow a relatively quick and easy method of adding more chutes 54 or other accessory equipment, such as, among others, printer stands, stack lights, encoder brackets, sensor brackets, electrical boxes, control boxes, and electrical cable hangers 106. To add an additional chute 54 to the frame 10, all that is required is to clamp an additional vertical support assembly 90 to the C-channel beam 14 adjacent to an existing vertical support assembly 90 and spaced from the existing assembly 90 so to mount the additional chute 54 therebetween. Then, the additional chute 54 is mounted to the existing vertical support assembly 90 and the additional vertical support assembly 90 through the upper and lower chute supports 142, 150. If it is desired to add further additional chutes 54 to the frame 10, yet have no space available on the existing frame 10, an additional frame 10 may be added to the existing frame 10 by mounting one end of the additional frame 10 to the second mounting portion 42 of an existing, adjacent pair of legs 30, and mount the other end of the additional frame 10 to the first mounting portion 38 of an additional pair of legs 30.

We claim:

1. An assembly for a sorting machine, comprising:
   at least one chute;
   a structural frame that supports the chute, the structural frame including
     first and second laterally spaced beams, at least one of the beams including a projecting edge thereon;
     at least one cross-beam interconnecting the first and second laterally spaced beams, the at least one cross-beam including a projecting edge thereon;
   a support that couples the chute to one of the first beam, the second beam, and the cross-beam, wherein the support engages the projecting edge of the beams and cross-beams; and
   a backing plate fastened to the support, wherein the projecting edge is clamped between the backing plate and the support to selectively secure the support to the projecting edge.

2. The assembly of claim 1, wherein the beams and cross-beams include a C-shaped cross section defining two lip portions, the lip portions being the projecting edge.

3. The assembly of claim 2, wherein the support and backing plate clamp to the lip portions to selectively secure the support to the lip portions.

4. The assembly of claim 2, wherein the laterally spaced beams are substantially parallel, wherein an area between the laterally spaced beams defines an interior section of the frame, and wherein the lip portions of the laterally spaced beams face away from the interior section.

5. The assembly of claim 1, wherein the laterally spaced beams and the cross-beam are made from sheet steel.

6. The assembly of claim 1, wherein the cross-beam is welded to the laterally spaced beams.

7. An assembly for a sorting machine, comprising:
   at least one chute;
   a structural frame that supports the chute, the structural frame including
     a beam including a projecting edge thereon;
     a support that couples the chute to the beam, the support including a portion of a clamp adapted to engage the projecting edge of the beam to selectively secure the support to the projecting edge; and
     a backing plate fastened substantially parallel to the support, the backing plate defining another portion of the clamp, wherein the projecting edge is clamped between the backing plate and the support to selectively secure the support to the projecting edge.

8. The assembly of claim 7, wherein the beam includes a C-shaped cross section defining two lip portions, the lip portions being the projecting edge.

9. The assembly of claim 8, wherein the beam comprises a first beam, further comprising:
   a second beam including a C-shaped cross section defining two lip portions, wherein the second beam is coupled substantially parallel to the first beam; and
   a cross-beam interconnected between the first beam and second beam, wherein an area between the first beam and second beam defines an interior section of the frame, and wherein the lip portions of the first beam and second beam face away from the interior section.

10. The assembly of claim 9, wherein the first beam, second beam, and cross-beam are made from sheet steel.

11. The assembly of claim 9, wherein the cross beam is welded to the first beam and second beam.

12. The assembly of claim 9, wherein the cross beam includes a C-shaped cross section.

13. The assembly of claim 7, wherein the projecting edge includes two spaced and substantially coplanar lip portions.

14. The assembly of claim 7, further comprising a guide plate coupled to the support to align the support relative to the beam, the guide plate being positioned between and substantially coplanar with the two lip portions.

15. The assembly of claim 14, wherein the guide plate is welded to the support, and wherein the guide plate is positioned between the backing plate and the support.

16. An assembly for a sorting machine, comprising:
- at least one chute;
- a structural frame that supports the chute, the structural frame including two laterally spaced beams, at least one of the beams including a projecting edge thereon;
- at least one cross-beam interconnecting the two laterally spaced beams;
- a support that couples the chute to one of the laterally spaced beams, wherein the support engages the projecting edge of the beam; and
- a backing plate fastened to the support, wherein the projecting edge is clamped between the backing plate and the support to selectively secure the support to the projecting edge.

* * * * *